(12) United States Patent
Lerzer et al.

(10) Patent No.: US 11,077,861 B2
(45) Date of Patent: Aug. 3, 2021

(54) CONTROL APPARATUS FOR ENABLING FUNCTIONS, MOTOR VEHICLE HAVING A CONTROL APPARATUS AND METHOD FOR OPERATING A CONTROL APPARATUS

(71) Applicant: AUDI AG, Ingolstadt (DE)

(72) Inventors: Jürgen Lerzer, Neumarkt (DE); Hans Georg Gruber, Ingolstadt (DE); Christoph Dalke, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/263,467

(22) PCT Filed: Jul. 18, 2019

(86) PCT No.: PCT/EP2019/069313
§ 371 (c)(1),
(2) Date: Jan. 26, 2021

(87) PCT Pub. No.: WO2020/038664
PCT Pub. Date: Feb. 27, 2020

(65) Prior Publication Data
US 2021/0163030 A1 Jun. 3, 2021

(30) Foreign Application Priority Data
Aug. 22, 2018 (DE) ...................... 10 2018 214 158.4

(51) Int. Cl.
*B60W 50/06* (2006.01)
*G06F 9/30* (2018.01)
(Continued)

(52) U.S. Cl.
CPC ......... *B60W 50/06* (2013.01); *G06F 9/30098* (2013.01); *H04L 9/0643* (2013.01);
(Continued)

(58) Field of Classification Search
CPC ......... B60W 50/06; B60W 2050/0044; B60W 2050/065; G06F 9/30098; H04L 9/3247; H04L 9/0643; H04L 2209/38
(Continued)

(56) References Cited

U.S. PATENT DOCUMENTS 8,751,827 B1 6/2014 Duane et al.
9,417,834 B2 8/2016 Ricci
(Continued)

FOREIGN PATENT DOCUMENTS

EP 2966806 A1 1/2016
WO WO 2016/182747 A1 11/2016
(Continued)

OTHER PUBLICATIONS

International Search Report and Written Opinion of the International Searching Authority directed to related International Patent Application No. PCT/EP2019/069313, dated Dec. 11, 2019, with attached English-language translation; 17 pages.
(Continued)

*Primary Examiner* — Maceeh Anwari
(74) *Attorney, Agent, or Firm* — Sterne, Kessler, Goldstein & Fox P.L.L.C,

(57) ABSTRACT

The disclosure relates to a control apparatus for enabling functions, comprising an integrated circuit. The control apparatus has a function register unit for storing at least one entry relating to an enabled state of a respective circuit function and/or of a respective circuit area of the integrated circuit. The integrated circuit is configured to enable the respective circuit function and/or the respective circuit area for use in accordance with the at least one entry in the function register unit. The control apparatus has a function control unit configured to respond to a predetermined actuation signal by changing the at least one entry in the function
(Continued)

register unit, wherein the change is made only if a predetermined authenticity check based on a cryptographic method confirms a source of the actuation signal is authorized, so that the function control unit is actuatable only by a trusted source.

10 Claims, 2 Drawing Sheets

(51) Int. Cl.
    *H04L 9/06*     (2006.01)
    *H04L 9/32*     (2006.01)
    *B60W 50/00*     (2006.01)

(52) U.S. Cl.
    CPC ..... *H04L 9/3247* (2013.01); *B60W 2050/0044* (2013.01); *B60W 2050/065* (2013.01); *H04L 2209/38* (2013.01)

(58) Field of Classification Search
    USPC .......................................................... 701/1
    See application file for complete search history.

(56) References Cited

U.S. PATENT DOCUMENTS

| | | |
|---|---|---|
| 2016/0185221 A1 | 6/2016 | Mere et al. |
| 2017/0046652 A1 | 2/2017 | Haldenby et al. |

FOREIGN PATENT DOCUMENTS

| | | |
|---|---|---|
| WO | WO 2017/125144 A1 | 7/2017 |
| WO | WO 2017/214864 A1 | 12/2017 |

OTHER PUBLICATIONS

Written Opinion of the Internaitonal Searching Authority directed to related International Patent Application No. PCT/EP2019/069313, dated Jun. 29, 2020, with attached English-language translation; 13 pages.

International Preliminary Report on Patentability directed to related International Patent Application No. PCT/EP2019/069313, completed Nov. 18, 2020, with attached English-language translation; 15 pages.

CONTROL APPARATUS FOR ENABLING FUNCTIONS, MOTOR VEHICLE HAVING A CONTROL APPARATUS AND METHOD FOR OPERATING A CONTROL APPARATUS

TECHNICAL FIELD

The disclosure relates to a control apparatus for enabling functions, a motor vehicle having a control apparatus, and a method for operating a control apparatus.

BACKGROUND

By way of background, US 2016/0185221 A1 describes a vehicle that can be retrofitted. The vehicle comprises a plurality of connectors for attaching components. The vehicle is configured to retrieve instructions for operating a new component from an external source.

U.S. Pat. No. 9,417,834 B2 discloses a vehicle which has one or more processing units. The respective processing unit is configured to provide exchangeable functional units.

DETAILED DESCRIPTION

Figure 1:
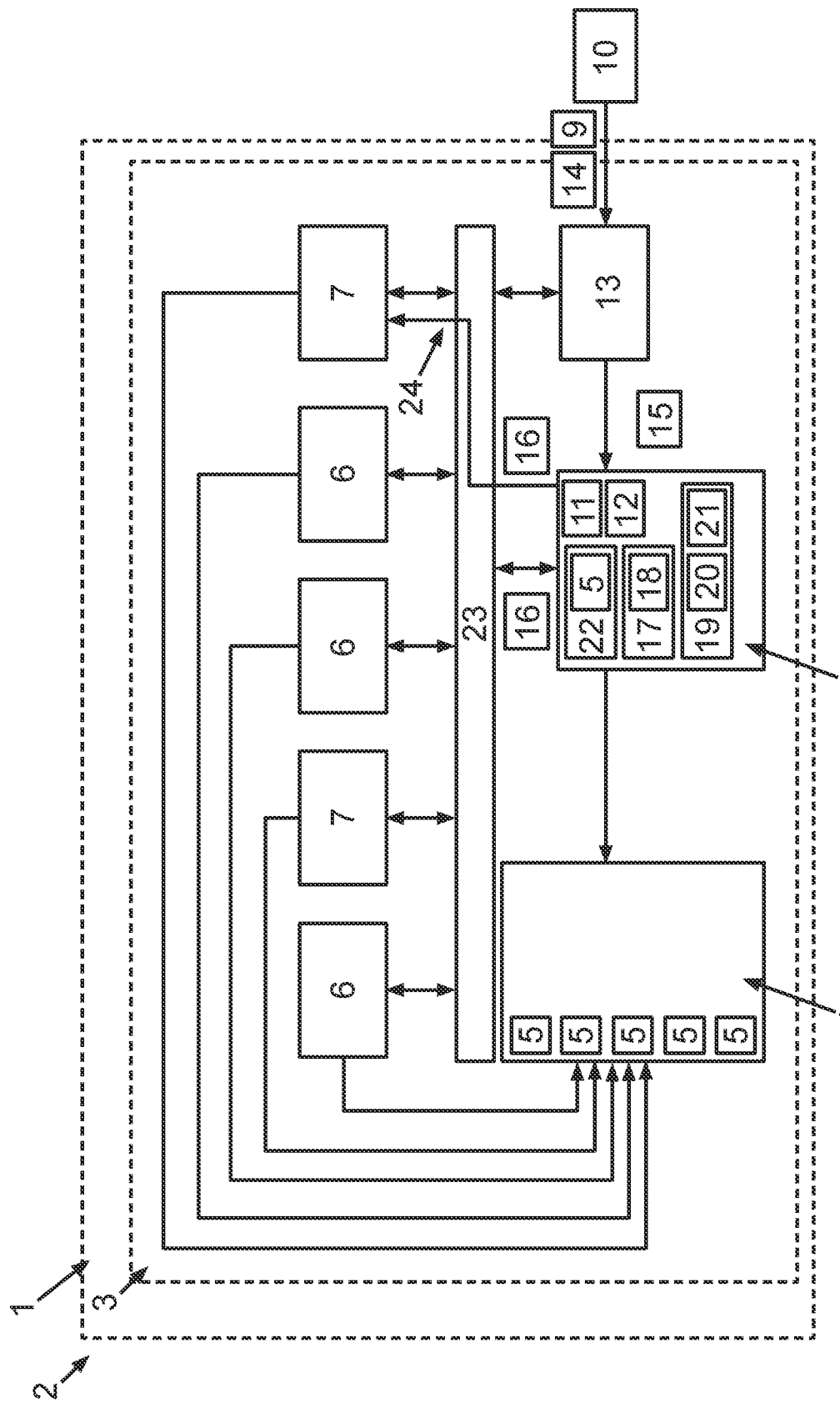
FIG. 1 shows a possible embodiment of the control apparatus according to the disclosure.

The disclosure relates to a control apparatus for enabling functions, a motor vehicle having a control apparatus, and a method for operating a control apparatus.

Information systems are used in motor vehicles which differ from one another in terms of their functional scope. These information systems allow functions of the motor vehicle to be operated and navigation and motor vehicle information to be output. Information systems often allow playback of media files, which is why they are also referred to as entertainment or infotainment systems. If an individual information system with specific components is used to provide a certain range of functions, this leads to increased development effort. This is due to the development of the respective hardware, the coordination of the individual components, and the provision of the associated drivers. Additional effort arises if information systems are to be provided for different vehicle types which differ from one another in terms of their respective equipment. This leads to an additional need for adjustment in the design of the information system and the provision of the respective software for the operation of the information system.

In order to reduce the development effort and the need for coordination when providing software updates, it is advantageous to use uniform components and thus to provide an identical substructure for different embodiments of the information systems. This reduces the number of variants and thus allows a reduction in maintenance and development costs. Another advantage is that uniform software can be used for different information systems. The functional scope of a respective information system is achieved by an adjustment of the respective components. Here, a respective component in its basic configuration has a plurality of circuit areas, which together provide a maximum of functions. For an adjustment of the component to a desired functional scope of an information system, circuit areas in the component that are assigned to an undesired function are deactivated. This is carried out, for example, by deliberately severing lines which connect the circuit area to be deactivated.

The disadvantage of this procedure is the fact that the adjustment of the hardware is irreversible. This means that it is not possible to reactivate a deactivated circuit area afterward. A reactivation may be necessary if, for example, the requirements for the respective component change. There may be a change in the requirements, for example, due to an exchange of vehicle components or a functional expansion of the information system.

US 2016/0185221 A1 describes a vehicle that can be retrofitted. The vehicle comprises a plurality of connectors for attaching components. The vehicle is configured to retrieve instructions for operating a new component from an external source.

U.S. Pat. No. 9,417,834 B2 discloses a vehicle which has one or more processing units. The respective processing unit is configured to provide exchangeable functional units.

It is an object of the disclosure to allow the motor vehicle electronics to be changed subsequently.

The object is achieved by the subject matter of the independent claims. Advantageous developments of the disclosure result from the features of the dependent claims, the following description, and the drawings.

According to the disclosure, a control apparatus to enable functions is provided which comprises an integrated circuit. The control apparatus has a function register unit for storing at least one entry relating to an enabled state of a respective circuit function and/or of a respective circuit area of the integrated circuit. The integrated circuit is configured to enable the respective circuit function and/or the respective circuit area for use in accordance with the at least one entry in the function register unit. The control apparatus has a function control unit which is configured to change the at least one entry in the function register unit in response to a predetermined actuation signal. The change only takes place if a predetermined authenticity check based on a cryptographic method confirms a source of the actuation signal as authorized. Due to the authenticity check, the function control unit is configured to be controlled only by trusted sources. A source can therefore be trusted if the authenticity check confirms authorization.

In other words, the control apparatus comprises the function register unit, wherein at least one entry is stored in the function register unit which defines the enabled state of the respective circuit function and/or the respective circuit area of the integrated circuit of the control apparatus. The respective circuit function and/or the respective circuit area is enabled by means of the integrated circuit according to the entry in the function register unit. The function control unit of the control apparatus is configured to change the at least one entry in the function register unit in the case of the predetermined actuation signal. For the change, it is necessary that the source of the actuation signal is confirmed as authorized by means of the authenticity check based on a cryptographic method.

The disclosure has the advantage that the functional scope of the integrated circuit can be adjusted by means of the actuation signal.

It can be provided, for example, that the control apparatus is an SOC unit (system on a chip/one chip system) which has the integrated circuit. The control apparatus can comprise the function register unit, which can, for example, be a section of the integrated circuit. The function register unit can be configured to store the at least one entry. The entry can define whether the respective circuit function assigned to the entry and/or the respective circuit area of the integrated circuit is enabled. According to the at least one entry, the integrated circuit can be activated or deactivated the respective circuit area or the respective circuit function. The control apparatus also comprises the function control unit, which can be an area of the integrated circuit. The function control unit can be controlled by means of the predetermined actuation signal in order to change the at least one entry in the function register unit. It can be provided that the entry in the function register unit is only changed by the function control unit if the source of the actuation signal is confirmed as being authorized. The authorization of the source can be verified by means of the cryptographic method through the authenticity check. It can thus be provided that the actuation signal must have a checksum and/or a digital signature so that the entry can be changed by the function control unit. The source can be, for example, a control unit of the control apparatus. In this case it can be provided that this control unit is configured to actuate the function control unit. The source can also be a central computer, which can be arranged outside the control apparatus. It can be provided that, for example, only a central computer from one manufacturer of the control unit can access the function control unit.

The disclosure also includes optional developments, the features of which result in additional advantages.

A further development of the disclosure provides that only the function control unit is configured to change the at least one entry in the function register unit.

In other words, the at least one entry in the function register unit can only be changed by the function control unit of the respective control apparatus.

This has the advantage that it is not possible to bypass the authenticity check by using another component of the control apparatus.

It can be provided, for example, that the control apparatus is configured in such a way that an input connection of the function register unit, which has to be activated to change the at least one entry, is only connected to one output of the function control unit. Signals to the function register unit can therefore only be received by the function control unit. Alternatively, it can be provided, for example, that the at least one entry in the function register unit can only be changed by the actuation of the function register unit according to a predetermined protocol, the function control unit being the only element of the control apparatus that is configured to actuate the function register unit by means of the predetermined protocol.

A further development of the disclosure provides that the control apparatus is configured to carry out the authenticity check using an asymmetric key pair or a blockchain.

In other words, the control apparatus is configured to verify the authorization of the source of the actuation signal by means of an authenticity check, the authenticity check comprising a cryptographic method based on the asymmetric key pair or the blockchain.

This has the advantage that impairment of the functionality of the control apparatus due to actuation of unauthorized sources can be avoided.

It can be provided, for example, that the authenticity check is based on the RSA method. A private key can be stored in the authorized source, with which the authorized source can generate a digital signature and add it to the actuation signal. It can thus be verified that the authorized source is the originator of the actuation signal. In order to be able to verify the digital signature, a public key, which is assigned to the private key, may be required. The private key and the public key can form the asymmetric key pair. The public key can be stored in the function control unit. It can be provided, for example, that the function control unit is configured to verify the digital signature, which is attached to the actuation signal, by means of the public key. If the verification of the digital signature is successful, the function control unit can change the corresponding entry in the function register unit. If the verification is not successful, this can mean that the actuation signal comes from an unauthorized source. In this case, it can be provided that the actuation signal is not processed further by the control apparatus and no change in the entry is made.

A further development of the disclosure provides that the function control unit is an area of the integrated circuit of the control apparatus.

In other words, the function control unit is a circuit which is arranged in the integrated circuit of the control apparatus.

This has the advantage that an independent area is provided for actuation of the function register unit.

It can be provided, for example, that the function control unit is designed as a hardware IP (intellectual property core) in the integrated circuit. This can be a predetermined semiconductor design which is part of the integrated circuit of the control apparatus.

A further development of the disclosure provides that the function control unit is software from a trusted runtime environment.

In other words, the function control unit is a separate runtime environment.

This has the advantage that the function control unit can be operated on a processor.

It can be provided, for example, that the function control unit is a trusted runtime environment, which is also designated a trusted execution environment (TEE). This can be provided, for example, on a separate processor of the control apparatus or on a processor on which a runtime environment for functions of the control apparatus is executed. The access to the trusted runtime environment by processes of the further runtime environment can be restricted so that manipulation of the trusted runtime environment can be excluded.

A further development of the disclosure provides that the control apparatus comprises a non-rewritable storage element and/or a PUF unit for storing an identification value of the control apparatus.

In other words, the control apparatus has the non-rewritable storage element and/or the PUF unit, these being configured to store the identification value of the control apparatus.

This results in the advantage that the respective control apparatus is identified uniquely by means of the assigned identification value and can only be changed by physical intervention.

It can be provided, for example, that the control apparatus comprises a ROM module (read only memory) as a non-rewritable storage element, the identification value being stored in the storage element. The identification value cannot be changed subsequently. As an alternative to this or in addition to this, the control apparatus can have the PUF unit (physical unclonable functions), which can be a physically non-clonable functional unit. This can be a component or a circuit that can have an unambiguous feature as an identification value. This feature can be based on production-related peculiarities of the unit, which distinguishes the respective PUF unit from structurally identical PUF units. The PUF unit can thus be used for the unambiguous identification of the control apparatus.

A further development of the disclosure provides that the control apparatus comprises a network interface, and the function control unit is configured to receive the predetermined actuation signal via the network interface.

In other words, the control apparatus has the network interface which is configured to receive the predetermined actuation signal for the function control unit.

This has the advantage that it is possible to actuate the control apparatus from a network.

For example, it is possible for the control apparatus to have a GSM or Ethernet interface as the network interface. The function control unit can be connected to the network interface via a wire, for example. It can be provided that the actuation signal can be received via the network interface and forwarded to the function control unit. The function control unit can finally receive the actuation signal.

A further development of the disclosure provides that the function control unit is configured to read out the at least one entry in the function register unit when the request signal is received and to send it as an output signal.

In other words, the function control unit is configured to receive the request signal and then to read out the enabling state specified in the at least one entry in the function register unit. The function control unit is configured to generate and send the output signal, with the output signal containing whether the respective circuit area or the respective circuit function is enabled by the at least one entry.

This has the advantage that the entries in the function register unit can be queried from the control apparatus for external devices.

It can be provided, for example, that a central computer sends the request signal to the control apparatus and that this is received by the function control unit. The request signal can include data on the relevant entries which are to be read out from the function register unit by the function control unit. The function control unit can query the respective entries from the function register unit and generate the output signal. The output signal can be provided for a protocol of the central computer. The output signal is transmitted to the central computer by the function control unit, it being possible for the output signal to include the requested entries.

A further development of the disclosure provides that the function control unit is configured to send a reset signal to the respective circuit area of the integrated circuit in order to restart the respective circuit area.

In other words, the control apparatus is configured to restart the respective circuit area of the integrated circuit by means of the reset signal.

This results in the advantage that the respective circuit area can be restarted by the function control unit after a change to the respective entry in the function register unit so that a change can be implemented.

It can be provided, for example, that the entry of the function register unit which is assigned to the respective circuit area of the integrated circuit is changed by the function control unit in order to deactivate the respective circuit area. It may be possible that the change requires the circuit area to be restarted so that it can be enabled according to the new entry. In order to make this possible, it can be provided that the function control unit transmits the reset signal to the respective circuit area after a change in the respective entry in the function register unit. The circuit area can restart when the reset signal is received and, at the beginning of the start, can retrieve the respective enabling state from the function register unit.

A further development of the disclosure provides that the control apparatus has at least one dedicated line for transmitting the reset signal, which connects the function control unit to only one of the circuit areas of the integrated circuit.

In other words, the function control unit is connected to a single one of the circuit areas of the integrated circuit via the dedicated line. The dedicated line is configured to transmit the reset signal to only one of the circuit areas of the integrated circuit.

This has the advantage that a separate line is provided for the transmission of the reset signal.

It can be provided, for example, that the function control unit has a connection at which the function control unit can output the reset signal. This connection can be connected to one of the circuit areas of the integrated circuit via the dedicated line. It can be provided that only the function control unit and the one circuit area of the integrated circuit are connected to one another by the dedicated line. If the circuit area is to be restarted, it can be provided that the function control unit outputs the reset signal at the connection so that it is only transmitted to the respective circuit area via the dedicated line.

A further development of the disclosure provides that the function control unit comprises an expiration register for storing at least one expiration entry relating to an expiration date or an expiration period of the at least one entry of the function register unit and is configured to ascertain a current time and/or a current date, and to change the at least one entry in the function register unit if the expiration date or the expiration period is exceeded.

In other words, the function control unit comprises the expiration register in which expiration entries are stored, the expiration entries having an expiration date or an expiration period of the at least one entry in the function register unit. The function control unit is configured to ascertain the current time and/or the current date. The function control unit is configured to change the at least one entry in the function register unit to which the expiration entry is assigned. The change is carried out if the expiration date or the expiration period is exceeded by the current time and/or the current date.

This has the advantage that functions and/or circuit areas can be enabled as a function of a time.

It can be provided, for example, that an entry relating to an enabling state of a circuit area is stored in the function register unit. The entry in the function register unit can stipulate that said circuit area is enabled. The respective expiration entry in the expiration register can be assigned to the entry in the register unit. The expiration entry can have the expiration date and/or the expiration period. The function control unit can be configured to retrieve the current time and/or the current date from the control apparatus. The function control unit can be configured to compare the current time and/or the current date with the expiration date and/or the expiration period. It can be provided that the entry in the function register unit relating to the circuit area is changed by the function control unit if the expiration date or the expiration period are exceeded. The expiration date can include, for example, a predetermined date and/or a time at which the entry is to be changed. The expiration period can be, for example, a period after a point in time of a change in the entry by the function control unit. Provision can be made for the entry to be changed due to the expiration of the entry in the function register unit by the function control unit so that the respective circuit area is deactivated.

A further development of the disclosure provides that the function control unit has a storage device and is configured to store the at least one entry in the function register unit in the storage device before it is changed.

In other words, the function control unit is configured to store the at least one entry in the function register unit in a storage device of the function control unit before the entry in the function register unit is changed by the function control unit.

This has the advantage that it is possible to reset the entry to its original state after a change.

It can be provided, for example, that a circuit area of the circuit is to be enabled by the function control unit. The function control unit can be configured to read out the at least one entry in the function register unit and to store it in the storage device. The entry in the function register unit can then be changed. If, for example, a period of time has elapsed or a specific actuation signal is received by the function control unit, it can be provided that the function control unit retrieves the entry from the storage device. The entry of the function register unit is changed in accordance with the entry in the storage device. This means that the entry can be reset to its original value before the change.

A further development of the disclosure provides that the function control unit comprises a profile storage device for storing at least two profiles, the respective profile comprising at least one profile entry. A profile is assigned to a respective identifier. The function control unit is configured to change the at least one entry of the function register unit according to the at least one profile entry of the respective profile upon receipt of the respective identifier.

In other words, the function control unit has the profile storage device in which at least two profile entries are stored. The respective profile has at least one profile entry and an identifier. The function control unit is configured to change the at least one entry of the function register unit to the at least one profile entry of the respective profile, when the function control unit receives the respective identifier which is assigned to the respective profile. This has the advantage that a plurality of entries can be specified using the profiles.

For example, it can be provided that profiles are stored in the profile storage device of the function control unit, a respective profile having profile entries which define how the respective entries of the function register unit are to be changed by the function control unit when the respective profile is selected. A respective identifier which identifies the respective profile can be assigned to a respective profile. It can be provided that the function control unit is configured to receive the respective identifier. According to the profile entries of the profile identified by the identifier, the entries in the function register unit are changed by the function control unit.

The disclosure also comprises a method for operating a control apparatus to enable functions.

By a function control unit with a predetermined actuation signal, at least one entry relating to an enabled state of a respective circuit function and/or of a respective circuit area of the integrated circuit of a function register unit is changed. In this case, the change is made only if a predetermined authenticity check based on a cryptographic method confirms a source of the actuation signal is authorized. By means of the integrated circuit, the respective circuit function and/or the respective circuit area for use in accordance with the at least one entry in the function register unit is enabled.

Accordingly, the disclosure also comprises a motor vehicle with an embodiment of the control apparatus according to the disclosure.

The motor vehicle can be, for example, a passenger car or a truck.

The disclosure also comprises the combinations of the features of the described embodiments.

The disclosure also includes developments of the method according to the disclosure and of the motor vehicle according to the disclosure, which have features as were previously described in conjunction with the developments of the control apparatus according to the disclosure. For this reason, the corresponding further developments of the method according to the disclosure and the motor vehicle according to the disclosure are not described again here.

Embodiments of the disclosure are described below by way of example. In the drawings:

FIG. 1 shows a possible embodiment of the control apparatus according to the disclosure.

Figure 2:
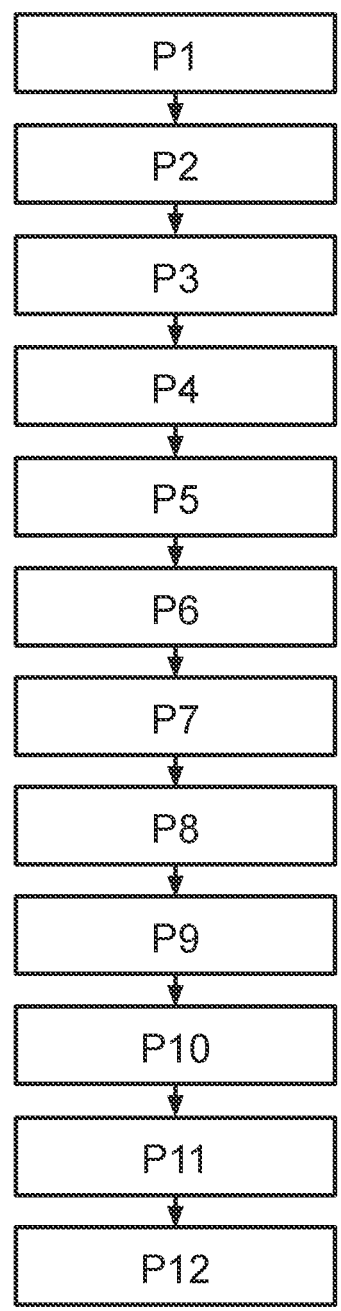
FIG. 2 shows a possible embodiment of the method according to the disclosure.

FIG. 2 shows a possible embodiment of the method according to the disclosure.

The embodiments explained in the following are preferred embodiments of the disclosure. In the embodiments, the described components of the embodiments each represent individual features of the disclosure which are to be considered to be independent of one another and which each further develop the disclosure independently of one another. Therefore, the disclosure shall also comprise other combinations of the features of the embodiments than the ones presented. Furthermore, the described embodiments may also be supplemented by further features of the disclosure as already described.

In the drawings, functionally identical elements are each denoted with the same reference signs.

FIG. 1 shows a possible embodiment of the control apparatus according to the disclosure.

The control apparatus 1 can be arranged in a motor vehicle 2, for example. The control apparatus 1 can have the integrated circuit 3. The control apparatus 1 can have the function register unit 4 in which the entries 5 can be stored. The at least one entry 5 can define the enabled state of the respective circuit function 6 and/or of the respective circuit area of the integrated circuit 7. The integrated circuit 3 can be configured to enable the respective circuit function 6 and/or the respective circuit area 7 according to the at least one entry 5 of the function register unit 4 for use. The control apparatus 1 can have the function control unit 8, which can be configured to change the at least one entry 5 of the function register unit 4 in response to the predetermined actuation signal 9. It can be provided that a change to the entry 5 by means of the function control unit 8 is only made if the source 10 of the actuation signal 9 is confirmed as authorized by means of the predetermined authenticity check of the actuation signal 9 based on a cryptographic method. The authenticity check can be carried out, for example, using a cryptographic method which is carried out using an asymmetric key pair. Provision can also be made for the authenticity check to be carried out on the basis of a blockchain process. A further development of the disclosure provides that the function control unit 8 comprises a non-rewritable storage element 11 and/or a PUF unit 12 for storing an identification value of the control apparatus 1. The control apparatus 1 can comprise a network interface 13, which can be configured to allow the actuation signal 9 for the function control unit 8 to be received. The function control unit 8 can be configured to receive the request signal 14. The request signal 14 can contain a request that the function control unit 8 reads out at least one entry 5 from the function register unit 4 and sends it as an output signal 15. The output signal 15 can, for example, describe which circuit functions 6 or circuit areas 7 are enabled by the entries 5 of the function register unit 4. The function control unit 8 can be configured to transmit the reset signal 16 to the respective circuit area of the integrated circuit 7 in order to restart it. The reset signal 16 can be a predetermined voltage value, for example. The control apparatus 1 can include the expiration register 17, which can have at least one expiration entry 18. The expiration entry 18 can, for example, specify a point in time and/or a period. The expiration entry 18 can be assigned to a respective entry 5 of the function register unit 4. The function control unit 8 can change the respective entry 5 of the function register unit 4 when the expiration entry 18 is exceeded. The circuit functions 6 and circuit areas 7 can be configured to read out the respective entry 5, which can be stored in the function register unit 4, and to become active or inactive according to the entry 5. The profiles 19, which can have the profile entries 20, can be stored in the function control unit 8. The profile entries 20 can define which of the respective entries 5 of the function register unit 4 is enabled when the respective profile 19 is activated. An identifier 21 can be assigned to a respective profile 19. If the respective identifier 21 is selected, it can be provided that the entries 5 of the function register unit 4 are changed by the function control unit 8 in accordance with the profile entries 20. The function control unit 8 can comprise a storage device 22 in which the entries 5 of the function register unit 4 can be stored before a change by the function control unit 8. Provision can be made for the reset signal 16 to be transmitted either via the general structure 23 of the integrated circuit 3 or via the dedicated lines 24 which connect the function control unit 8 directly to the respective circuit area 7, wherein it is possible that no further circuit area 7 on the dedicated line 24 is connected.

Entertainment apparatuses for motor vehicles are preferably developed as platforms which are used in a plurality of vehicle lines from one or more manufacturers. The different vehicle lines in which the entertainment apparatuses are to be used can range from an entry-level segment to a premium segment. For the future, it is planned that they will provide enough hardware resources for the services represented. It is provided that a margin with a reserve is also sufficient for expansions and retrofittable functions.

Usually, it is contemplated to use a scalable family of control apparatuses. Depending on the embodiment, the control apparatuses are scaled differently, the variants being different from the entry-level segment to the premium segment. Although the use of differently scaled variants of the same control apparatus results in advantages, such as, for example, the use of uniform software for all media devices, there are also some disadvantages.

In order to leverage the cost potential of system scaling, the differently scaled variants of a system family have different functions. They differ, for example, in the capabilities of the hardware, their mechanical properties, their interfaces and their thermal properties. This means that there are still expenses and costs involved in providing differently scaled systems in a system family.

In order to prepare a system for future feature developments, expansions, and downloadable functions, it may be necessary to use a version of the system with a higher performance. First of all, this can lead to higher costs for a vehicle manufacturer because the additional expense for the reserves cannot be fully implemented in the purchase price. It is also possible that the customer is not ready to invest in additional functions. The motor vehicle manufacturer does not have to bear any costs for hardware capabilities which are not useful for a specific version of a vehicle variant and/or for the service life of the vehicle. Control apparatuses, which are used for different vehicle lines or for different variants of the information system, differ as little as possible in their hardware, whereby a broader reuse of software and hardware can be used over different scaled variants of the information system. The aim is to provide an option of providing a cost-effective upgrade of the hardware in the event of a need by the user when he wants to use new or expanded functions of the entertainment apparatuses. A hardware update via radio is to be provided. An advantageous situation for the customer, the vehicle manufacturer, and the manufacturer of the information system can thus be achieved. The customer only has to pay for what he receives and can update the information system to achieve new functions or a higher level of performance. The motor vehicle manufacturer can avoid developing different variants as much as possible. He only pays for the hardware functions that are sold and paid for by the user when the motor vehicle is handed over. He has the option to update the hardware in order to transmit new or extended functions to the user. The manufacturer of the information systems can avoid developing different variants as much as possible. Expanding the scope of functions through hardware updates creates a new source of income for the manufacturer.

The basic idea can be described as follows:

A control apparatus comprises the function control unit. This can be the only integrated circuit of the control apparatus that can write entries into the function register unit and thus enable respective circuits and functions of the control apparatus. The function control unit can be configured in such a way that only permissible sources from outside and inside the control apparatus can access them. Access can take place via secure communication. It can be provided that the manufacturer of the control apparatus has the only approved source that can access the function control unit. In order to be able to identify permissible sources and to secure the communication, it can be provided to use cryptographic methods. The cryptographic methods can be based on an exchange of key files or blockchain technology.

The function control unit can be configured to identify the control apparatus, for example by means of a chip ID, which can be stored in a write-once storage device and/or in a function that cannot be physically cloned. The function control unit can be configured to communicate with a central computer of the manufacturer via IT-based communication and a network interface, the network interface being able to provide wired and/or wireless communication connections to the IP-based network. The communication is usually provided by a processor which provides the protocol layers for the IP-based communication. The function control unit can be configured to enter new entries in the function register unit when an update, which can include an expansion or restriction, is carried out or initiated by the central computer. The function control unit can be configured to transmit current entries of the function register unit to the central computer if the central computer requests this by means of a request signal.

The function register unit of the control apparatus can be the only source within the control apparatus which can determine the functional scope of the control apparatus. This can mean that, for example, a register for determining the maximum frequency of processor cores can be read out directly through the area of the circuit which regulates the maximum frequency of the processor cores.

Examples of functions that are defined by the function register unit can include: a maximum frequency of processor cores, the activation or deactivation of individual processor cores, a maximum size of usable buffers, a maximum frequency of graphics units, the activation or deactivation of graphics units, a maximum frequency of neural processors, the activation or deactivation of neural processors must, a maximum frequency of digital signal processors, the activation or deactivation of digital signal processors, the activation or deactivation of hardware accelerators, the activation or deactivation of inputs and outputs or the maximum usable storage bandwidth.

FIG. 2 shows how the function control unit can be used to enable functions.

The example describes a possible use of the control apparatus 1 in a motor vehicle, wherein the control apparatus 1 can be used in an infotainment apparatus.

In step P1, a user can request enabling the circuit function 6 and/or the circuit area 7 of the integrated circuit 3 by means of a user input on a user interface of the infotainment apparatus. Enabling can, for example, relate to an expansion of a CPU capacity.

In step P2, a request signal can be generated by the infotainment apparatus and sent to a central computer of a manufacturer of the infotainment apparatus or of the motor vehicle 2, which describes the circuit area 7 of the integrated circuit 3 to be enabled.

In step P3, the central computer can receive the request signal and verify the admissibility and applicability of the requested enabling operation.

In step P4, the central computer can transmit a signal to the source 10. The source 10 can be a central enabling computer from a manufacturer of the control apparatus 1. The source 10 can generate the actuation signal 9 to enable the circuit function 6 and/or the circuit area 7 of the integrated circuit 3.

In step P5, the central computer can send a predetermined communication signal to the infotainment apparatus. When the communication signal is received by the infotainment apparatus, the infotainment apparatus is set to a mode in which direct communication between the control apparatus 1 and the source 10 is made possible. If the infotainment apparatus is in said mode, the infotainment apparatus can transmit a signal to the central computer which signals that the control apparatus 1 is ready for communication.

In step P6, the central computer can instruct the source 10 using a signal to transmit the actuation signal 9 to the control apparatus 1. The source 10 can generate the actuation signal 9 and sign it using the cryptographic method.

In step P7, the control apparatus 1 can verify the signature in the scope of the authenticity check using the cryptographic method and thus confirm the authorization of the source 10 of the actuation signal 9. Actuation of the control apparatus 1 is thus permitted and the source 10 can actuate the function control unit 8 via a protected connection by means of the actuation signal 9 in order to enable an expansion of the CPU capacity.

In step P8, the function control unit 8 can process the actuation signal 9 and change the entry 5 of the function register unit 4, which relates to the enabled state of the CPU capacity. For this purpose, it can be provided that an output of the function control unit 8 can be connected to an input of the function register unit 4 via a separate line.

In step P9, the function control unit 8 can send a confirmation signal to the source 10, which signals that the enabling operation of the expansion of the CPU capacity has been carried out by means of a change to the assigned entry 5 in the function register unit 4.

In step P10, the source 10 can transmit a signal to the central computer in order to confirm the transmission of the actuation signal 9 and the enabling operation.

In step P11, the central computer can transmit a notification signal to the control apparatus 1 in order to confirm the enabling operation that was carried out. Upon receipt of the notification signal, the control apparatus 1 can issue a request to the user to restart the control apparatus 1 in order to activate the expansion.

In step P12, the central computer can send a signal comprising payment information to the source.

The manufacturer of the control apparatus (in the example the "infotainment system") and the manufacturer of the integrated chip (in the example the "infotainment system SoC") can be different. The disclosure now allows the manufacturer of the integrated chip to control the release of hardware functions in the integrated chip directly, independently of the manufacturer of the control apparatus. This allows the manufacturer of the integrated chip to benefit from feature upgrades in the field.

It can be provided that the predetermined actuation signal 9 for enabling the circuit function 6 and/or the circuit area 7 is sent by the source 10 to the control apparatus 1 when a predetermined program is obtained by the control apparatus 1 from the central computer. Alternatively, the control apparatus can be configured to automatically send the request signal to the source 10 when the predetermined program is installed and/or started on the control apparatus 1. It can be provided that information about required circuit functions 6 and/or circuit areas 7 of the integrated circuit 3 is stored in the program, which information may be required for the operation of the program. It can also be provided that a transmission of the predetermined actuation signal 9 is automatically carried out by the source 10, when the program is downloaded from the source 10 by the control apparatus 1.

It can be provided that the actuation signal 9 to deactivate the enabled state of the respective circuit function 6 and/or the respective circuit area 7 of the integrated circuit is carried out automatically through the source 10, when the expiration date and/or the expiration period of the at least one entry 5 of the function register unit 4 has expired.

The method is not limited to single-chip systems. It can also be used for storage units or general circuits.

Overall, the examples show how the disclosure allows a subsequent change in the motor vehicle electronics.

The invention claimed is:

1. A method for operating a control apparatus of an infotainment apparatus of a motor vehicle for enabling functions, wherein the control apparatus comprises an integrated circuit, the method comprising:
  receiving, by the infotainment apparatus, a user request for enabling a circuit function and/or a circuit area of the integrated circuit from a user;
  creating, by the infotainment apparatus, a corresponding request signal based on the user request;
  transmitting, by the infotainment apparatus, the corresponding request to a central computer of a manufacturer of the infotainment apparatus or a central computer of the motor vehicle;
  receiving, by the central computer, the corresponding request;
  verifying, by the central computer, a admissibility and an applicability of the corresponding request;

transmitting, by the central computer, a signal to a central enabling computer of a manufacturer of the control apparatus, wherein the signal is associated with the corresponding request;

sending, by the central computer, a predetermined communication signal to the infotainment apparatus;

receiving, by the infotainment apparatus, the predetermined communication signal;

setting, by the infotainment apparatus, the infotainment apparatus to a mode, wherein a direct communication between the control apparatus and the central enabling computer is enabled in the mode;

transmitting, by the infotainment apparatus, in response to setting the infotainment apparatus to the mode, a second signal to the central computer, wherein the second signal indicates that the control apparatus is ready for communication;

instructing, by the central computer, the central enabling computer to transmit an actuation signal to the control apparatus by sending a third signal;

generating, by the central enabling computer, a control signal associated with the user request using a cryptographic method, and transmitting the control signal to the control apparatus;

verifying, by the control apparatus, a signature of the control signal using the cryptographic method;

confirming, by the control apparatus, an authorization of the central enabling computer based on verifying the signature;

permitting, by the control apparatus, an actuation of the control apparatus;

processing, by a function control unit of the control apparatus, the actuation signal and changing at least one entry of a function register unit, wherein the at least one entry of the function register unit is associated with the circuit function and/or the circuit area of the integrated circuit;

enabling, by the integrated circuit, the circuit function and/or the circuit area for use based on the at least one entry of the function register unit;

sending, by the function control unit, a confirmation signal to the central enabling computer, wherein the confirmation signal indicates enabling the circuit function and/or the circuit area of the integrated circuit by changing the at least one entry of the function register unit;

transmitting, by the central enabling computer, a second confirmation signal to the central computer to confirm transmitting the actuation signal and the enabling the circuit function and/or the circuit area of the integrated circuit; and transmitting, by the central computer, a notification signal to the control apparatus to confirm enabling the circuit function and/or the circuit area of the integrated circuit, wherein the central enabling computer controls the function control unit of the control apparatus by means of the actuation signal via a protected connection.

2. The method of claim 1, wherein the function control unit is associated with the at least one entry of the function register unit.

3. The method of claim 1, wherein verifying the signature further comprises verifying the signature using an asymmetric key pair or a block-chain method.

4. The method of claim 1, wherein receiving the predetermined actuation signal further comprises receiving the predetermined actuation signal via a network interface of the control apparatus.

5. The method of claim 1, further comprising:
reading, by the function control unit, the at least one entry of the function register unit; and
sending, by the function control unit, the at least one entry of the function register unit as an output signal upon receiving a request signal.

6. The method of claim 1, further comprising transmitting, by the function control unit, a reset signal to the circuit area of the integrated circuit to restart the circuit area.

7. The method of claim 6, wherein transmitting the reset signal further comprises transmitting the reset signal via at least one dedicated line, wherein the at least one dedicated line connects the function control unit to the circuit area of the integrated circuit.

8. The method of claim 1, further comprising:
storing, by the function control unit, at least one expiration entry relating to an expiration date or an expiration period of the at least one entry of the function register unit in an expiration register;
determining, by the function control unit, a current time and/or a current date; and
changing, by the function control unit, the at least one entry of the function register unit if the expiration date or the expiration period is exceeded.

9. The method of claim 1, further comprising:
storing, by the function control unit, the at least one entry of the function register unit in a storage device of the function control unit before changing the at least one entry of the function register unit.

10. The method of claim 1, further comprising:
storing, by the function control unit, at least two profiles in a profile storage device of the function control unit, wherein one of the at least two profile comprises at least one profile entry and is assigned to a respective identifier; and
changing, by the function control unit, the at least one entry of the function register unit according to the at least one profile entry upon receiving the respective identifier.

* * * * *